United States Patent [19]

Safar

[11] Patent Number: 5,333,665
[45] Date of Patent: Aug. 2, 1994

[54] PORTABLE SHADE SYSTEM

[76] Inventor: Samir H. Safar, 13675 Tradition St., San Diego, Calif. 92128

[21] Appl. No.: 131,083

[22] Filed: Oct. 1, 1993

[51] Int. Cl.$^5$ .............................................. E06B 9/06
[52] U.S. Cl. ........................ 160/84.1 D; 160/84.1 F; 160/134; 160/351
[58] Field of Search ............... 160/84.1 D, 370.2, 351, 160/84.1 F; 296/97.7, 97.8, 97.9; 248/160

[56] References Cited

U.S. PATENT DOCUMENTS

| | | | |
|---|---|---|---|
| 3,649,069 | 3/1972 | Zip | 296/97.7 |
| 4,745,960 | 5/1988 | Karp | 160/84.1 F |
| 4,934,434 | 6/1990 | Schnebly et al. | 160/84.1 F |
| 5,033,628 | 7/1991 | Volcani | 160/351 |
| 5,158,127 | 10/1992 | Schumacher | 160/84.1 F |

*Primary Examiner*—Blair M. Johnson
*Attorney, Agent, or Firm*—Loyal M. Hanson

[57] ABSTRACT

A portable shade system includes a shade member for shading a user from the sun, an elongated member having proximal and distal end portions for supporting the shade member on an object, and a clamp attached to the proximal end portion of the elongated member for removably mounting the elongated member on the object. The shade member is arranged to fold from an open configuration to a closed configuration and to removable mount on the distal end of the elongated member to enable the user to remove the shade member. In one version, the shade member includes a suction cup member for enabling the user to mount the shade member on a car window apart from the elongated member. The shade member may include a sheet of foldable material (e.g., shade material of honeycomb construction) mounted between rigid end pieces with an elastic member that enables a user to rotate the end pieces from a closed configuration in which the sheet of foldable material is folded between the end pieces and an open configuration in which the sheet of foldable material is unfolded in a circularly shaped arrangement.

4 Claims, 5 Drawing Sheets

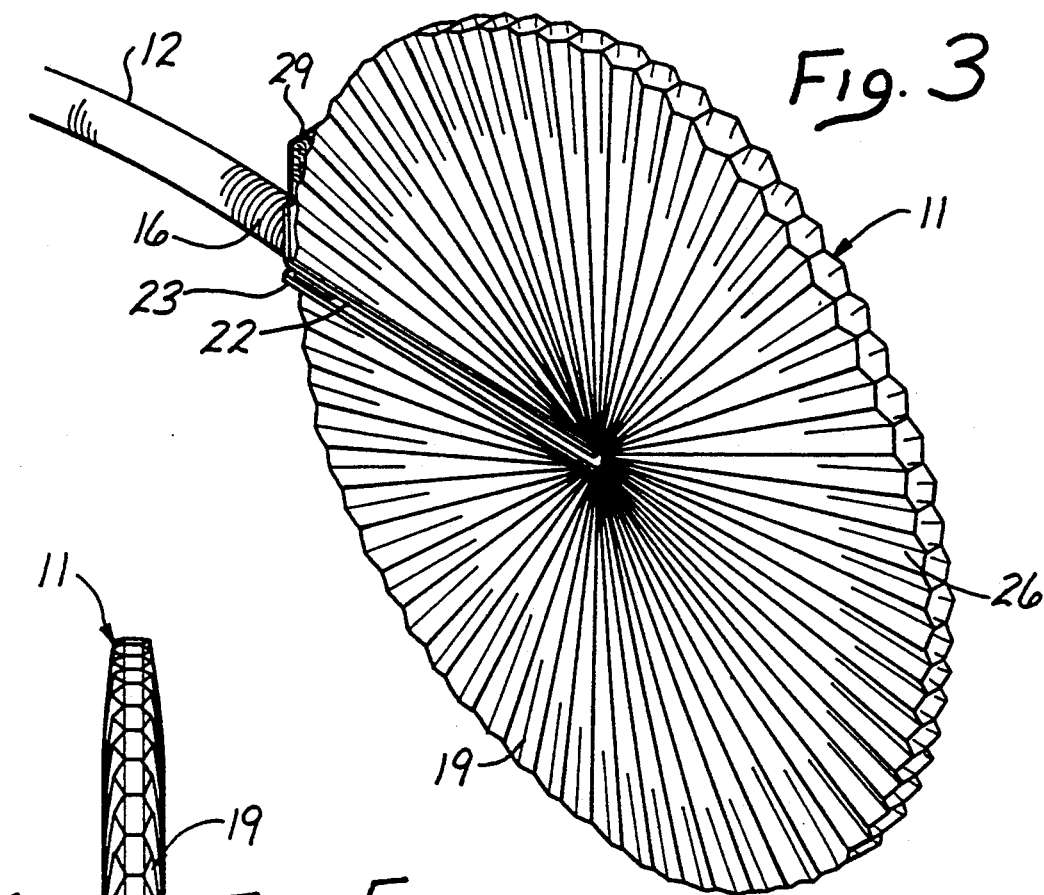
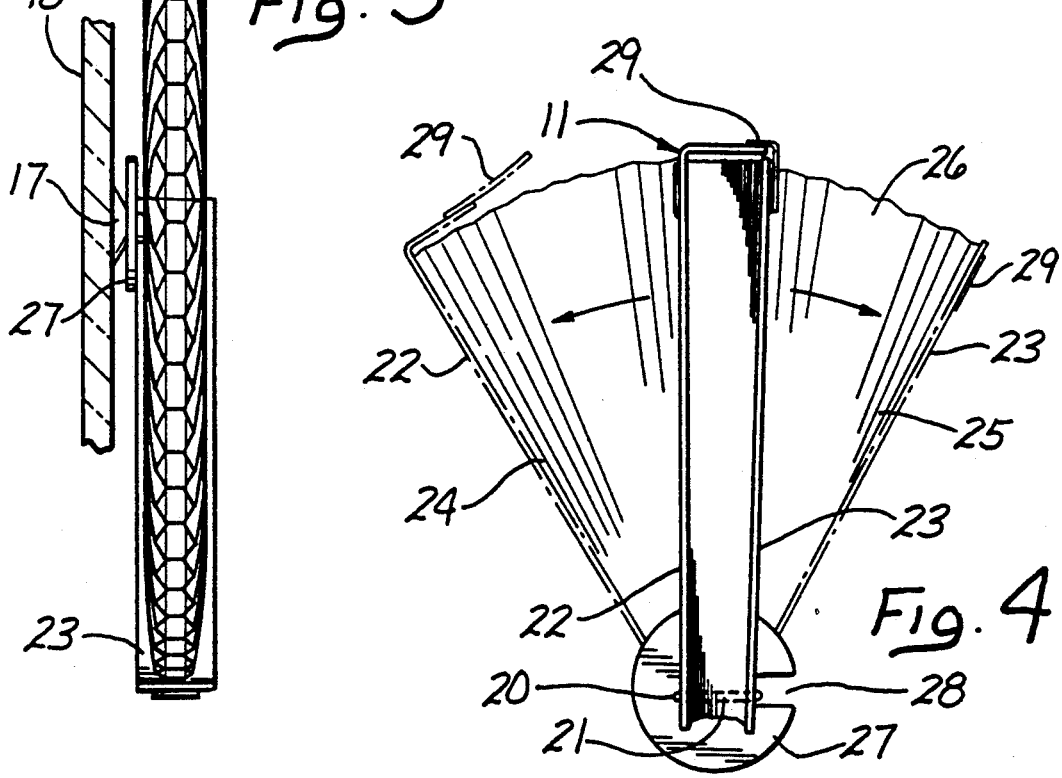

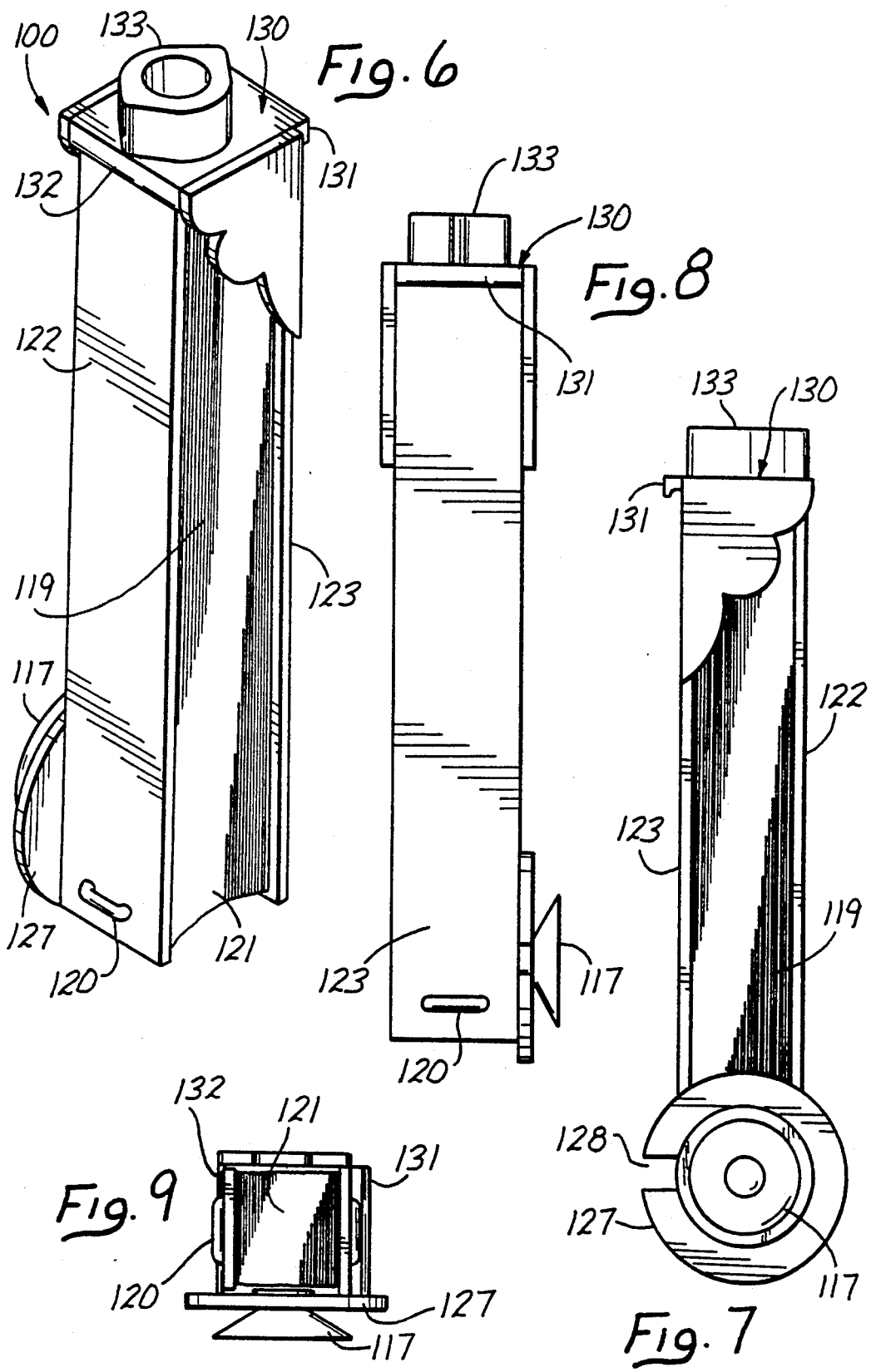

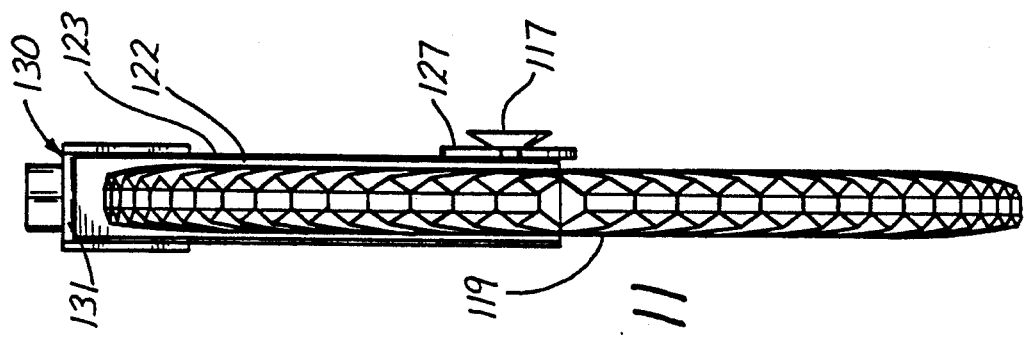
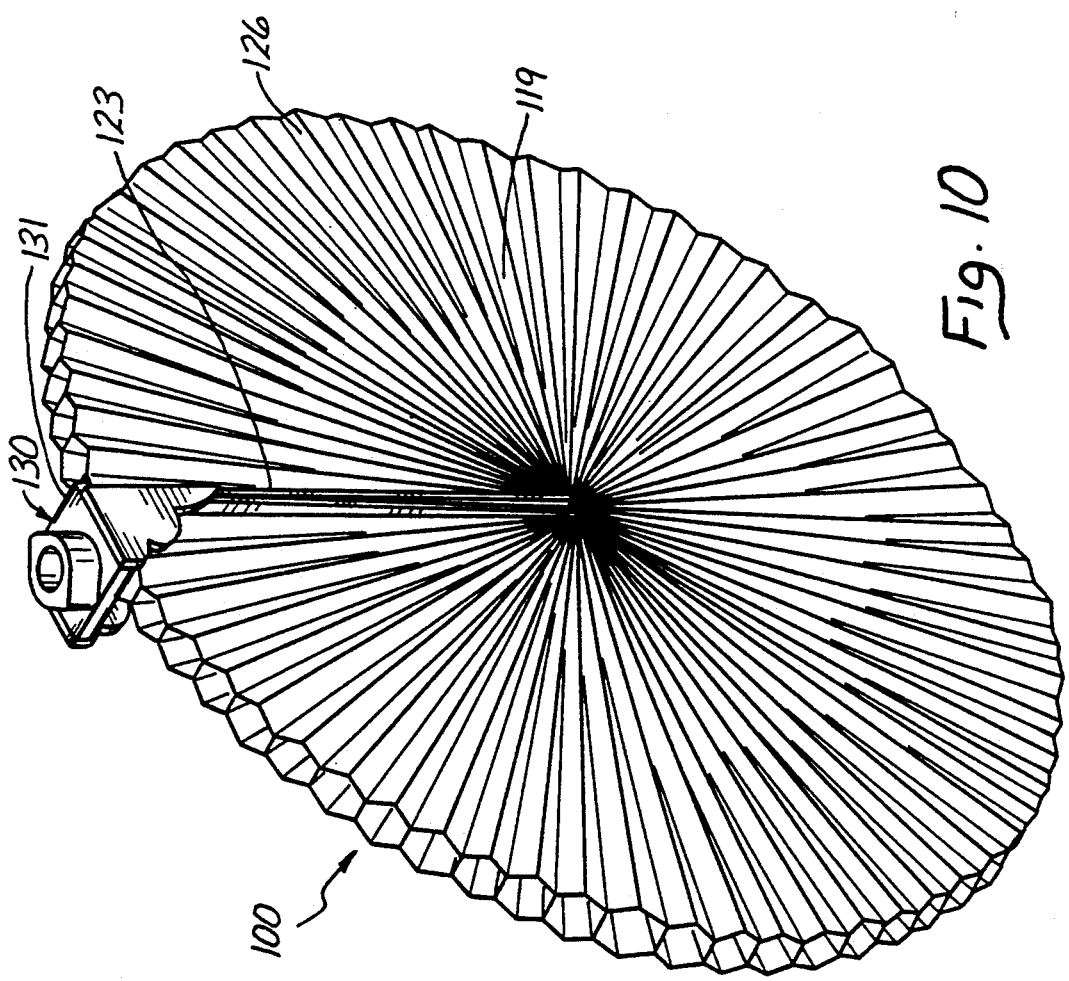

PORTABLE SHADE SYSTEM

BACKGROUND OF THE INVENTION

1. Technical Field

This invention relates generally to shades, and more particularly to a portable shade system for convenient protection in an automobile and various other settings against the heat and glare of the sun.

2. Background Information

Various portable shades exist that unfold from a closed configuration to an open configuration. But some are too bulky for convenient handling and storage. Others are designed for one particular use, such as for mounting on the window of an automobile, but remain unsuited for others, such as mounting on a baby's car seat. Still other existing shades are complicated, expensive articles that are not adaptable to modern shade materials. Thus, users need a better portable shade system.

Summary of the Invention

This invention solves the problems outlined above by providing a portable shade system that includes a shade member arranged to mount on a gooseneck accessory or stick on a car window. One version of the shade member includes commercially available shade material of honeycomb construction that folds between two rigid end pieces to a closed configuration for storage and unfolds to a circularly shaped open configuration for use. An elastic member enables superior folding/unfolding action.

In terms of the claim language that is subsequently developed, a portable shade system constructed according to the invention includes a shade member for shading a user from the sun, an elongated member having proximal and distal end portions for supporting the shade member on an object (e.g., a flexible gooseneck), and a clamp attached to the proximal end portion of the elongated member for removably mounting the elongated member on the object. The shade member is arranged to fold from an open configuration to a closed configuration and to removable mount on the distal end of the elongated member to enable the user to remove the shade member from the elongated member. A suction cup on the shade member enables a user to mount the shade member on a car window apart from the elongated member.

A foldable shade member constructed according to the invention includes a sheet of foldable material having opposite first and second end portions and opposite first and second marginal edge portions extending between the first and second end portions. It may take the form of a rectangularly shaped sheet of honeycomb shade material. Of course, materials other than honeycomb shade material may be used. First and second rigid end pieces are attached to respective ones of the first and second end portions of the sheet of foldable material, and an elastic member is strung through an end portion of each rigid end piece and through the first marginal edge portion of the sheet of foldable material. That enables a user to rotate the end pieces from a closed configuration in which the sheet of foldable material is folded between the end pieces and an open configuration in which the sheet of foldable material is unfolded in a circularly shaped arrangement.

The foregoing and other objects, features, and advantages of the invention become more apparent upon reading the following detailed description with reference to the illustrative drawings.

BRIEF DESCRIPTION OF THE DRAWINGS

FIG. 3 is a three-dimensional view of the foldable shade member in an open configuration;

FIG. 4 is front view of the foldable shade member showing further details of operation;

FIG. 5 is an end view of the foldable shade member mounted on a car window;

FIGS. 6–9 are enlarged views of a second version of the foldable shade member in the closed configuration; and FIGS. 10–13 are enlarged views of the second version in the open configuration.

DESCRIPTION OF THE PREFERRED EMBODIMENTS

Figure 1:
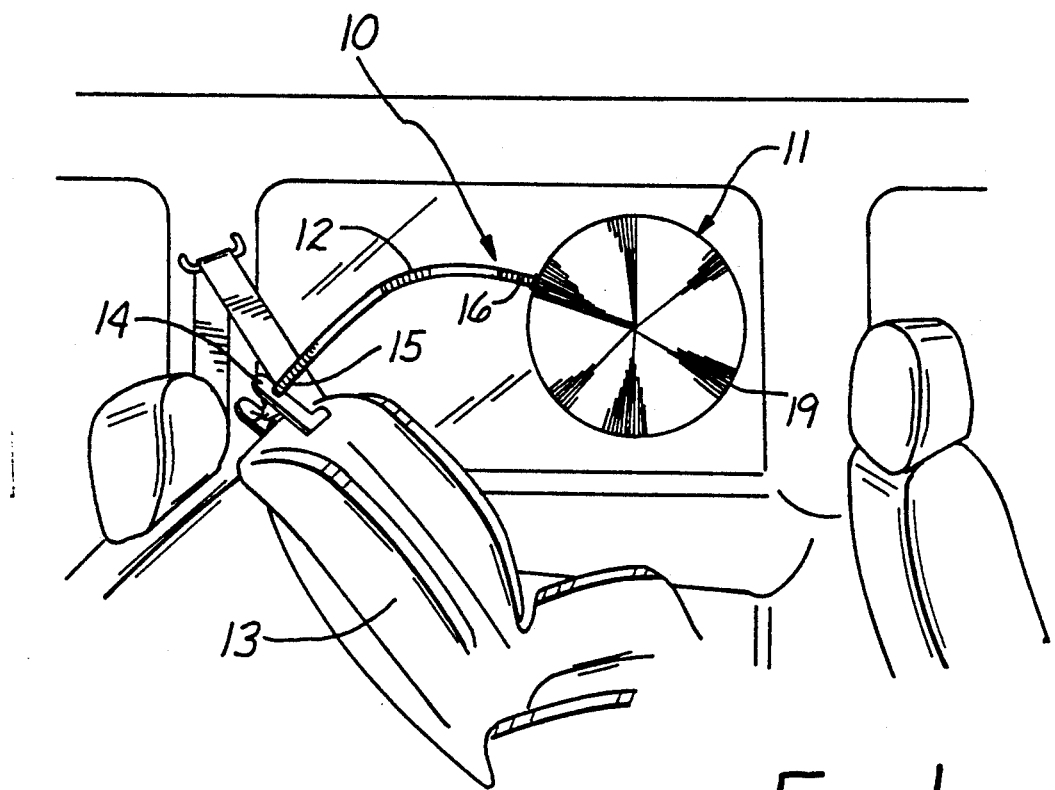
FIG. 1 of the drawings is a pictorial view of a portable shade system constructed according to the invention that is shown mounted on a child's car seat in an automobile.

FIGS. 1–5 of the drawings show various aspects of a portable shade system constructed according to the invention. The shade system is designated with a reference numeral 10 in FIG. 1 and it includes a shade member 11 for shading a user from the sun, an elongated member 12 for supporting the shade member 11 on an object (e.g., a car seat 13), and a clamp 14 for removably mounting the elongated member 12 on the car seat 13.

The elongated member 12 may take any of various suitable forms, including a flexible gooseneck such as those often used for lamps. Such a flexible gooseneck is commercially available in various suitable lengths (e.g., 12-inch and 18-inch lengths) from many sources, including Cashwag Electric of San Diego, Calif. It has a proximal end 15 to which the clamp 14 is suitably attached and a distal end 16 to which the shade member 11 is attached. The proximal and distal ends 15 and 16 may be threaded, for example, and the shade member 11 and the clamp 14 configured to screw onto the proximal and distal ends. The clamp 14 may also take any of various suitable forms, including a plastic clamp of sufficient size to clamp onto a portion of the car seat 13. Such a plastic clamp is available from House of Troy of Hyde Park, Vt.

To use the shade member 11 apart from the elongated member 12, the shade member 11 is removed from the elongated member 12 (e.g., by unscrewing it). Then, the shade member 1.1 is mounted elsewhere. For that purpose, the shade member 11 includes a suction cup 17 (FIGS. 2 and 5) that is suitably mounted on the shade member 11. The suction cup 17 may take the form of the commercially available suction cups used for hanging pictures and so forth, and it is pressed against a window pane 18 (FIG. 5) to mount the shade member 11 on the window pane.

Although any of various known designs may be employed for a shade member without departing from some of the broader inventive concepts disclosed, including pleated shades, roll shades, and wood, aluminum, or plastic slats, the shade member 11 uses a 6.25 by 48 inch rectangularly shaped sheet 19 of material of honeycomb construction (FIGS. 1–5). Such a honeycomb shade fabric is available under the trademark DUETTE by Hunter Douglas Inc. of Broomfield, Colo.

The sheet 19 is rectangularly shaped if allowed to lie unrestrained, although it is held in other than a rectangular shape when used in the shade member 11. The sheet 19 is held by an elastic member 20 (FIGS. 2 and 5) that is strung through holes in a first marginal edge portion 21 of the sheet 19 as well as through one or more holes in a first end portion of a first pieces 22 and one or more holes in a first end portion of a second end piece 23. The first and second end pieces 22 and 23 are attached to first and second end portions 24 and 25 of the sheet 19 (e.g., by gluing the end portions 24 and 25 of the sheet 19 to the end pieces). The end pieces 22 and 23 hold the marginal end portions 24 and 25 somewhat rigidly while the elastic member 20 allows enough play for opening.

Figure 2:
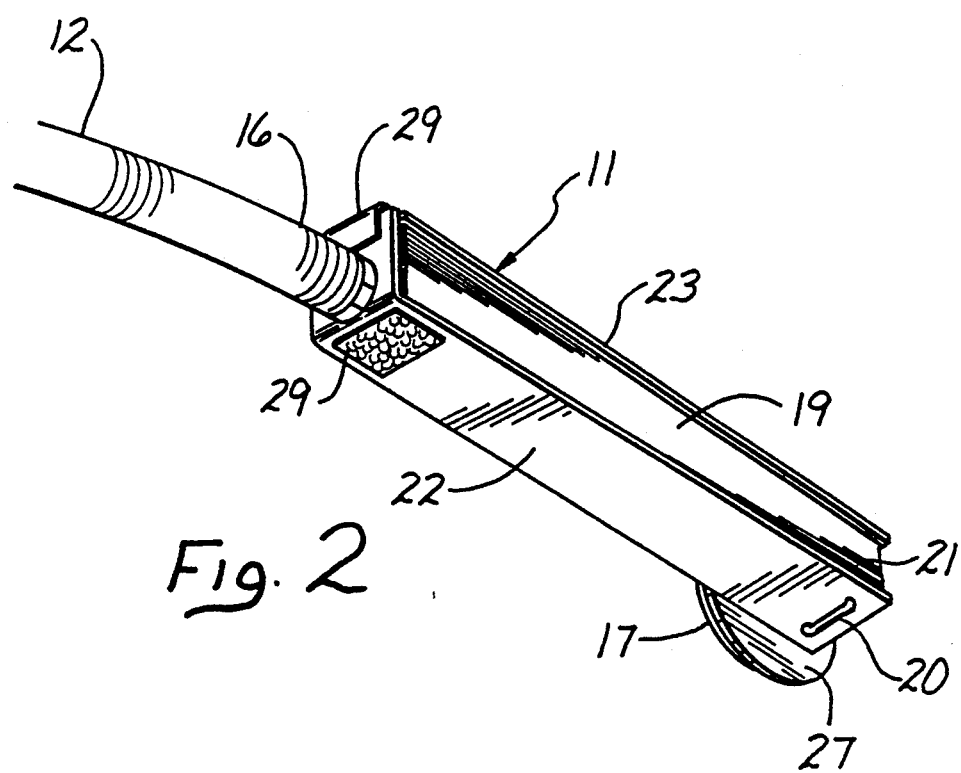
FIG. 2 is an enlarged three-dimensional view of the foldable shade member in a closed configuration.
Figure 12:
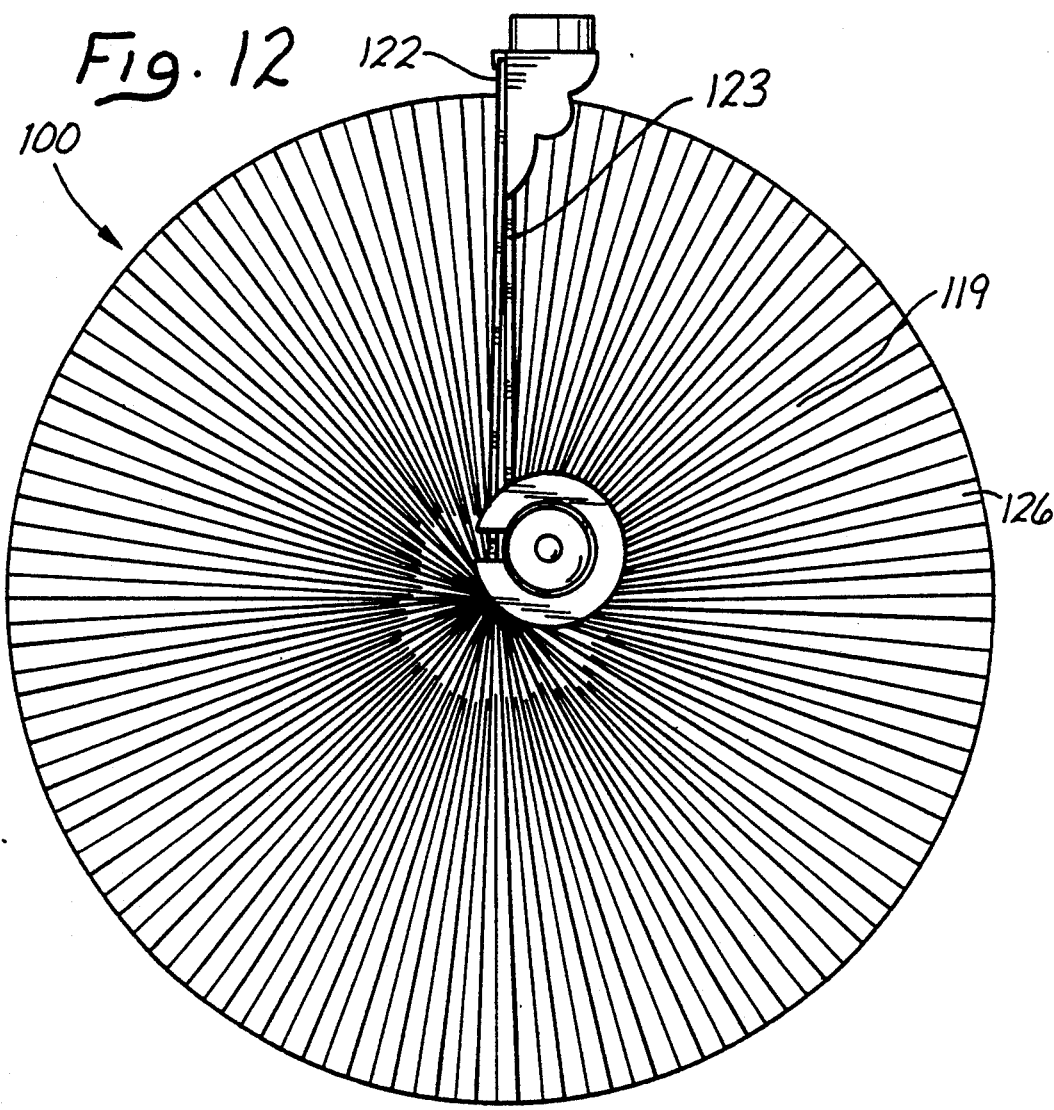
Figure 13:
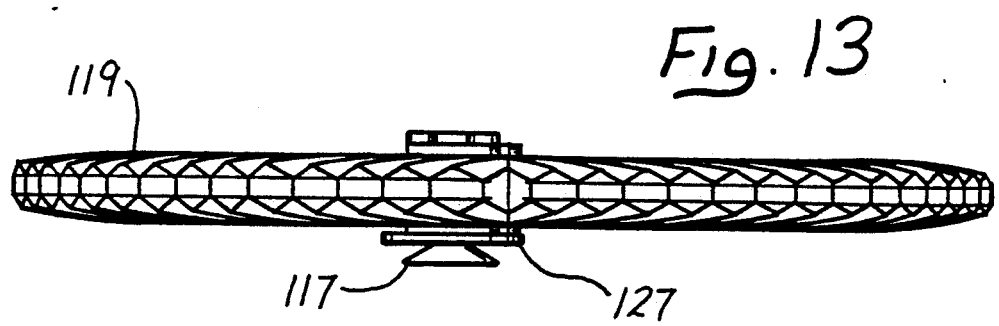

Constructing the shade member 11 in that inventive manner enables a user to open the shade member 11 (as depicted by the arrows in FIG. 4) from a closed configuration as shown in FIG. 2 to a circularly shaped open configuration as shown in FIG. 3. The elastic member 20 (e.g., a stretchable length of elastic) stretches as the end pieces 22 and 23 are rotated as depicted in FIG. 4 to allow a second marginal edge portion 26 (opposite the first marginal edge portion 21) to unfold into a circular shape as shown in FIG. 3, while also allowing the end pieces 22 and 23 to fold back against each other in the open configuration. Rigidly clamping the first marginal edge portion 21 does not allow that action. Other ways of holding the first marginal edge portion 21 can allow it to move out of the plane of the second marginal edge portion 26, with a conically shaped open configuration resulting.

The end pieces may be fabricated by suitable means (e.g., compression or injection molded polystyrene) to include a suction cup holder 27 (FIGS. 2, 4, and 5) with an opening 28 into which the suction cup 17 is pressed for purposes of mounting the suction cup 17 on the shade member 11. A suitable fastener arrangement 29 (FIGS. 2-4) serves to hold the end pieces 22 and 24 together in a selected one of the open and closed configurations. The fastener arrangement 29 may include loop-and-hook fabric fastener components available under the trademark VELCRO.

Other fastening means may be employed, however, and FIGS. 6-13 show a second version of a shade member that uses the end pieces for fastening purposes. The second version is designated by reference numeral 100. It is similar in many respects to the shade member 11 and so only differences are discussed in greater detail. For convenience, reference numerals designating parts of the shade member 100 are increased by one hundred over those designating parts of the shade member 11.

Like the shade member 11, the shade member 100 includes a rectangularly shaped sheet 119 of honeycomb shade material held by end pieces 122 and 123, However, the end pieces 122 and 123 are configured to snap together in the open and closed positions instead of including hook-and-loop fabric fastener elements. The end piece 123 includes a handle/fastener portion 130 (FIGS. 6-8). A protruding portion 131 (in other words, a hook member) on the handle/fastener portion 130 (FIGS. 6-8) engages the end piece 122 to hold the shade member 100 in the open position shown in FIGS. 10-13. A protruding portion 132 (FIG. 6) engages the end piece 122 in the closed position shown in FIGS. 6-9. The handle/fastener portion 130 also provides additional structure for a user to grasp for easy handling. A threaded collar portion 133 of the handle/fastener portion 130 is provided to enable a user to screw the shade member onto a gooseneck member such as the elongated member 12 in FIGS. 1-3.

Thus, both embodiments of the invention provides a portable shade system that includes a shade member arranged to mount on a gooseneck accessory or stick on a car window. Commercially available shade material of honeycomb construction may be used. An elastic member enables superior folding/unfolding action. Although exemplary embodiments have been shown and described, one of ordinary skill in the art may make many changes, modifications, and substitutions without necessarily departing from the spirit and scope of the invention.

What is claimed is:

1. A foldable shade member, comprising:
   a sheet of foldable material having opposite first and second end portions and opposite first and second marginal edge portions extending between the first and second end portions;
   first and second rigid end pieces, each of the end pieces having a first end portion and each of the end pieces being attached to a respective one of the first and second end portions of the sheet of foldable material such that the first end portion of the first end piece and the first end portion of the second end piece are disposed adjacent the first marginal edge portion of the sheet of foldable material without the first end portions of the first and second end pieces engaging one another; and
   an elastic member strung through the first end portion of each rigid end piece and through the first marginal edge portion of the sheet of foldable material to enable a user to rotate the end pieces from a closed configuration in which the sheet of foldable material is folded between the end pieces and an open configuration in which the sheet of foldable material is unfolded in a circularly shaped arrangement such that the first and second marginal edge portions of the sheet of foldable material are circularly shaped with the elastic member restraining the first marginal edge portion of the sheet of foldable material between the first end portions of the first and second end pieces so that the first marginal edge portion of the sheet of foldable material can unfold somewhat but only substantially less than the second marginal edge portion.

2. A foldable shade member as recited in claim 1, wherein the sheet of foldable material is at least partial of honeycomb construction.

3. A foldable shade member as recited in claim 1, wherein the shade member includes means in the form of a suction cup member attached to at least one of the end pieces for enabling the user to mount the shade member on a car window.

4. A foldable shade member, comprising:
   a generally rectangular sheet of foldable material having opposite first and second end portions and opposite first and second marginal edge portions extending between the first and second end portions;
   a first end piece in the form of an elongated strip of material having oppositely facing first and second sides and a first end portion, the first side being attached to the first end portion of the sheet of foldable material in a position such that the first end portion of the first end piece is adjacent the first marginal edge portion of the sheet of foldable material;

a second end piece in the form of an elongated strip of material having oppositely facing first and second sides and a first end portion, the first side being attached to the second end portion of the sheet of foldable material in a position such that the first end portion of the second end piece is adjacent the first marginal edge portion of the sheet of foldable material; and an elastic member strung through the first end portion of each end piece and through the first marginal edge portion of the sheet of foldable material to prevent the first marginal edge portion from fully unfolding as a user rotates the end pieces from a closed configuration and an open configuration;

the closed configuration being such that the first sides of the first and second end pieces are facing each other in generally parallel relationship with the sheet of foldable material folded between them and the first end portions of the first and second end pieces disengaged from each other; and the open configuration being such that the second sides of the first and second end pieces are facing each other in generally parallel relationship with the sheet of foldable material is unfolded in a circularly shaped arrangement and the first end portions of the first and second end pieces disengaged from each other such that the first and second marginal edge portions of the sheet of foldable material are circularly shaped with the elastic member restraining the first marginal edge portion of the sheet of foldable material between the first end portions of the first and second end pieces so that the first marginal edge portion of the sheet of foldable material can unfold somewhat but substantially less than the second marginal edge portion.

* * * * *